(12) United States Patent
Tsurumaki

(10) Patent No.: US 11,842,101 B2
(45) Date of Patent: Dec. 12, 2023

(54) NON-TRANSITORY STORAGE MEDIUM STORING PROGRAM FOR INSTALLING A DRIVER, AND RELATED INFORMATION PROCESSING METHOD AND INFORMATION PROCESSING APPARATUS

(71) Applicant: CANON KABUSHIKI KAISHA, Tokyo (JP)

(72) Inventor: Shota Tsurumaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/738,982

(22) Filed: May 6, 2022

(65) Prior Publication Data
US 2022/0374179 A1 Nov. 24, 2022

(30) Foreign Application Priority Data
May 21, 2021 (JP) .................................. 2021-086062

(51) Int. Cl.
*G06F 3/12* (2006.01)
(52) U.S. Cl.
CPC .......... *G06F 3/1225* (2013.01); *G06F 3/1203* (2013.01)
(58) Field of Classification Search
CPC .... G06F 3/1203; G06F 3/1204; G06F 3/1225; G06F 3/1288
See application file for complete search history.

(56) References Cited

U.S. PATENT DOCUMENTS

| 10,540,127 | B2 * | 1/2020 | Fukushima | G06F 3/1203 |
| 2003/0200291 | A1 * | 10/2003 | Kemp | H04L 67/02 709/222 |
| 2009/0225334 | A1 * | 9/2009 | Takamiya | G06Q 30/06 358/1.15 |
| 2012/0200877 | A1 * | 8/2012 | Kanamori | G06F 3/1206 358/1.13 |
| 2012/0212760 | A1 * | 8/2012 | Sakura | G06F 3/1204 358/1.13 |
| 2020/0159466 | A1 * | 5/2020 | Mosko | G06F 3/126 |

FOREIGN PATENT DOCUMENTS

JP 2019036896 A 3/2019

* cited by examiner

*Primary Examiner* — John R Wallace
(74) *Attorney, Agent, or Firm* — Canon U.S.A., Inc. IP Division

(57) ABSTRACT

Techniques and mechanisms are provided for causing a first terminal apparatus connected to a first network to: determine whether the first terminal apparatus is being used in a form in which a second terminal apparatus connected to a second network is remotely controlled, perform control, in a case where the first terminal apparatus is not being used in the form, so that a first driver is installed on the first terminal apparatus, the first driver being used by the first terminal apparatus to transmit a print job to a first image forming apparatus connected to the first network, and perform control, in a case where the first terminal apparatus is being used in the form, so that a second driver is installed on the second terminal apparatus, the second driver being used by the second terminal apparatus to transmit the print job to the first image forming apparatus.

12 Claims, 15 Drawing Sheets

NON-TRANSITORY STORAGE MEDIUM STORING PROGRAM FOR INSTALLING A DRIVER, AND RELATED INFORMATION PROCESSING METHOD AND INFORMATION PROCESSING APPARATUS

BACKGROUND

Field

The present disclosure relates to techniques and mechanisms for installing a driver.

Description of the Related Art

With the recent diversification of work styles, the introduction of a system called Bring Your Own Device (BYOD) has been studied in which a user brings his or her own terminal apparatus (e.g., personal computer (PC), tablet computer, or smartphone) to an office with him or her and uses it for business use. Under circumstances with such a system, it can occur that an apparatus such as an image forming apparatus that is owned by an individual is used for business use (for example, during the work from home), as well as for private use. There are studies of various methods for introducing a system in which an apparatus such as an image forming apparatus is used in different ways depending on the intended use under such circumstances. For example, Japanese Patent Application Laid-Open No. 2019-36896 discusses an example system for determining who bears the cost of using an image forming apparatus depending on the intended use.

It can occur that in circumstances in which a BYOD system is being used, a selective application is performed of an apparatus between two use forms for private use and for business use, respectively, even if the apparatus is a terminal apparatus owned by an individual.

SUMMARY

According to various embodiments of the present disclosure, a non-transitory computer readable storage medium is provided that stores a program for causing a first terminal apparatus connected to a first network to perform a process including: determining whether the first terminal apparatus is being used in a remote form in which a second terminal apparatus connected to a second network is remotely controlled, performing control, in a case where the first terminal apparatus is not being used in the remote form, so that a first driver is installed on the first terminal apparatus, the first driver being used by the first terminal apparatus to transmit a print job to a first image forming apparatus connected to the first network, and performing control, in a case where the first terminal apparatus is being used in the remote form, so that a second driver is installed on the second terminal apparatus, the second driver being used by the second terminal apparatus to transmit the print job to the first image forming apparatus.

Further features of the present disclosure will become apparent from the following description of example embodiments with reference to the attached drawings.

DESCRIPTION OF THE EMBODIMENTS

Figure 1:
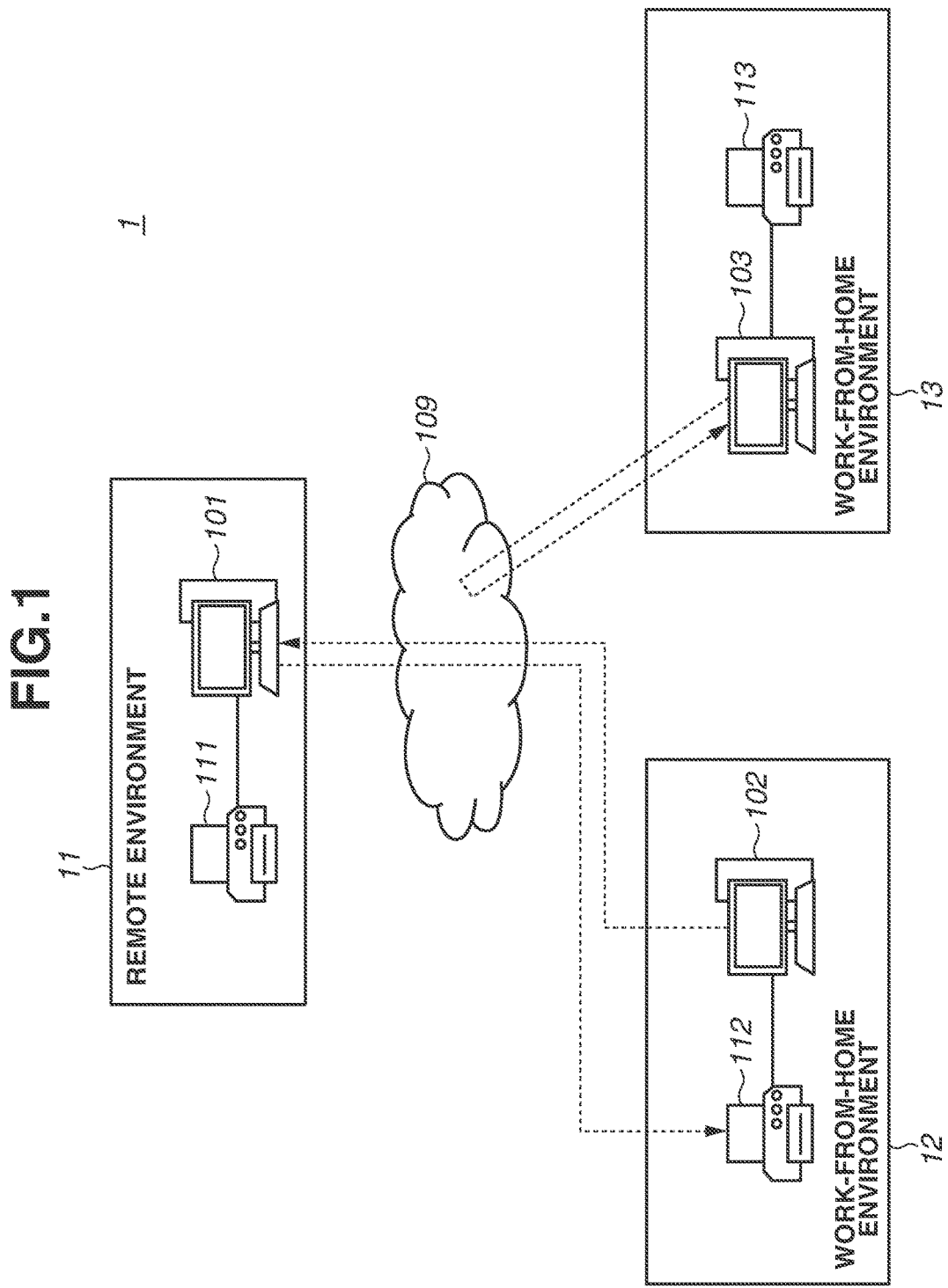
FIG. 1 illustrates an example of a schematic system configuration of an image processing system according to one embodiment.

Some example embodiments of the present disclosure will be described in detail below with reference to the accompanying drawings. In the specification and the drawings, like numbers refer to like components having substantially the same functions and redundant descriptions thereof are omitted.

As described above, with the recent diversification of work styles, the introduction of a system called Bring Your Own Device (BYOD) has been studied in which a user brings his or her own terminal apparatus (e.g., personal computer (PC), tablet computer, or smartphone) to an office with him or her and uses the terminal apparatus for business. Under circumstances with BYOD, for example, an employee of a company can carry his or her own personal terminal apparatus with him or her to use the terminal apparatus to access in-house resources (e.g., various types of data). That brings an expectation of exclusion of distance and time constraints caused by, for example, the employee's needing to return to the office to proceed to work.

In recent years, a print system with a cloud print service (CPS) in which a print job is input via a network service called a cloud service and is transmitted to an image forming apparatus has been in widespread use. In such a print system, the image forming apparatus to be used for printing via the CPS is preliminarily registered in the CPS. Under such conditions, the user installs an application for managing a predetermined printer driver and print jobs on a desired terminal apparatus, making it possible to use the CPS via the terminal apparatus.

In a specific example, desired print settings are made from various applications, and then a print job is transmitted to the CPS. Upon receiving the print job, the CPS stores the print job in a predetermined storage area to hold the print job. The print job held in the CPS can be referred to via the image forming apparatus preliminarily registered in the CPS. Specifically, when the user that has logged in to the image forming apparatus instructs the image forming apparatus to show a list of print jobs, the image forming apparatus displays the list of print jobs held in the CPS on a predetermined display area (e.g., a display). In this case, upon receiving the designation of a print job as a print target from the presented print job list, the image forming apparatus acquires the designated print job from the CPS and performs processing for printing based on the print job.

In some CPSs, an application for managing print jobs is installed on an information processing apparatus, regardless of whether an image forming apparatus is registered, so that various types of information about printing can be recorded on the information processing apparatus.

In particular, the recent increase in demand for work from home has resulted in frequent printing for business use during work from home. Thus, it can be assumed that image forming apparatuses (e.g., printers) used for printing during work from home mainly come in two types: an image forming apparatus for business supplied from a company for which the user works and an image forming apparatus owned by the user himself or herself for private and business use.

If the image forming apparatus supplied from the company is used for a print operation during work from home, that means that the image forming apparatus is used for business use. Thus, in this case, a report about the management of printing that has been performed (hereinafter also referred to as a "print report") is uploaded and recorded on the CPS under control of the company, thereby making it possible to perform various types of management processing for printing. In addition, if the user needs to replenish a consumable, the consumable can be delivered to the user's home, and the company for which the user works can bear the cost of printing during work from home.

On the other hand, if an image forming apparatus owned by an individual (employee) is used for print operation during work from home, that means that the image forming apparatus is useable for business use as well as for private use as described above. Under circumstances with BYOD, this use form of an apparatus, such as an image forming apparatus, is more likely to be applied in particular. In this case, it may be suitable for the cost of using the apparatus to be appropriately borne. In a specific example, it can be assumed that the cost of using the apparatus is split between the employee for private use and the company for business use (public use).

In the case illustrated above, drivers are useable as a tool for different uses depending on the use form of an apparatus such as an image forming apparatus (e.g., an image forming apparatus owned by an individual). Various embodiments of the present disclosure are directed to a system that allows different uses of a target apparatus used by an individual depending on the use form with a driver with a predetermined function installed in a terminal apparatus used by the individual for the target apparatus as well as its standard driver. Various embodiments of the present disclosure are also directed to a function (e.g., an installer) for constructing an environment that allows easier installation of the system for different uses of the target apparatus depending on the use form changed by switching drivers.

For convenience of description, the following description focuses on use of an image forming apparatus owned by an individual during work from home. Specifically, if a driver for an image forming apparatus owned by an individual is installed on a terminal apparatus owned by the individual, a driver with a function for using the image forming apparatus for business use added is installed in construction of an environment for work from home. The image forming apparatus owned by an individual corresponds to another option from the image forming apparatuses under control of a predetermined company.

The above-descried driver for the image forming apparatus with the function for using the image forming apparatus owned by the individual for business use added is hereinafter also referred to as a "driver for business use", for convenience of description.

In a specific example, if printing is performed using the image forming apparatus owned by the individual, a driver including a function for charging the company with the cost of the printing corresponds to an example of the above-described driver for business use. The function included in the driver for business use is not limited to the above-described cost management function, and any other function may be added, as long as the function uses an apparatus such as an image forming apparatus for business use.

A schematic system configuration example of an image processing system according to an example embodiment of the present disclosure will be described with reference to FIG. 1.

First, definitions of terms used in the present disclosure will be described below to facilitate understanding of the features of the image processing system according to the present example embodiment.

In the present disclosure, the work-from-home environment schematically refers to an operational environment in which a user that is an employee of a predetermined company uses a terminal apparatus, such as a personal computer (PC), and various apparatuses, such as an image forming apparatus, that are owned by the user. In a specific example, a system with the terminal apparatus and various apparatuses owned by the user connected via a so-called home network (e.g., a local area network (LAN)) corresponds to an example of the work-from-home environment. In another example, a system with the terminal apparatus and various apparatuses owned by the user connected through a transmission path, such as a cable, via a port compatible with a predetermined standard such as a universal serial bus (USB) can also correspond to an example of the work-from-home environment.

In the present disclosure, an in-house environment schematically refers to an operational environment in which the user (employee) uses terminal apparatuses, such as PCs, and various apparatuses, such as an image forming apparatus, that are under control of a predetermined company. In a specific example, a system with terminal apparatuses and various apparatuses that are under control of a predetermined company connected via a network to which access from an external apparatus is limited, such as an in-house LAN, corresponds to an example of the in-house environment. The in-house environment may include logical components such as a cloud service and a virtual PC, in addition to substantive components including terminal apparatuses, such as PCs, and various apparatuses, such as an image forming apparatus.

In the present disclosure, a remote environment schematically refers to an operational environment in which the user (employee) can use the in-house environment (e.g., an in-house network) by accessing the in-house environment from the outside on a desired terminal apparatus in the in-house environment. In a specific example, a system including the terminal apparatus and various apparatuses useable by accessing the in-house environment from the outside from among the terminal apparatuses and various apparatuses included in the in-house environment corresponds to an example of the remote environment.

In the present example embodiment, it is assumed that the user as an employee of the predetermined company uses the image forming apparatus owned by the user in two use forms for business purpose during work from home. FIG. 1 illustrates a schematic system configuration example for each use form, assuming that the two types of use forms are provided in different work-from-home environments, respectively, for convenience of description. Specifically, an image processing system 1 according to the present example embodiment includes a remote environment 11, work-from-home environments 12 and 13, and a CPS 109.

The remote environment 11 schematically illustrates a remote environment under control of the company to which the user (employee) belongs. In the example illustrated in FIG. 1, the remote environment 11 includes an image forming apparatus 111 and a remote terminal 101. The remote terminal 101 is an example of a terminal apparatus on which the user can control operations by accessing the terminal apparatus from a network (second network) outside an in-house network (first network) including the remote environment 11 (also including the in-house network (first network) including the remote environment 11) using a desired terminal apparatus (e.g., a client terminal 102). The image forming apparatus 111 is an example of the image forming apparatus under control of the company.

The CPS 109 performs various types of management processing for printing using the image forming apparatus when the user that is an employee of the company uses the image forming apparatus owned by the user for business use. In a specific example, the CPS 109 issues various instructions (e.g., a print job transmission instruction) for printing to the image forming apparatus that is owned by the user and is registered in advance. In another example, when the image forming apparatus owned by the user is used for business use, the CPS 109 manages the history of performing processing for printing using the image forming apparatus, and manages the cost of using the image forming apparatus. The operations of the CPS 109 in association with the management processing will be described in detail below.

The CPS 109 may be as a CPS under control of the company. In this case, the CPS 109 can be included in the in-house environment (in other words, the in-house environment including the remote environment 11) under control of the company.

The work-from-home environment 13 schematically illustrates an example of the work-from-home environment in which the user can reference data managed under the in-house environment by accessing the in-house environment via the Internet or another network from the outside of the in-house environment using a desired terminal apparatus. The access from an external apparatus to the environment to which access from an external apparatus is limited, such as the in-house environment, via another network, such as the Internet, can be gained by a technique such as a virtual private network (VPN) connection. The use form described above in association with the work-from-home environment 13 is hereinafter also referred to as a "first use form", for convenience of description.

The work-from-home environment 13 includes a client terminal 103 and an image forming apparatus 113. The client terminal 103 schematically illustrates a terminal apparatus owned by a user (employee). The image forming apparatus 113 schematically illustrates an image forming apparatus owned by the user. In other words, the image forming apparatus 113 corresponds to an example of another image forming apparatus different from the image forming apparatus (e.g., the image forming apparatus 111) under control of the company to which the user belongs.

In the first use form, information (e.g., a log) about the execution of processing is transmitted to the CPS 109 if the processing for printing for business use is performed using the image forming apparatus 113 based on an instruction (e.g., a print job) for printing from the client terminal 103. This configuration allows the operation in which the cost of using the image forming apparatus 113 for business use is managed based on information collected by the CPS 109.

The work-from-home environment 12 schematically illustrates an example of the work-from-home environment used in the use form in which the user controls the remote terminal 101 via a desired terminal apparatus by accessing the remote environment 11 from the outside of the remote environment 11 using the terminal apparatus. Examples of a technique for controlling the remote terminal 101 included in the remote environment 11 from the outside of the remote environment 11 include a remote desktop technique and a remote control technique. The use form described above in association with the work-from-home environment 12 is hereinafter also referred to as a "second use form", for convenience of description.

The work-from-home environment 12 includes the client terminal 102 and an image forming apparatus 112. The client terminal 102 schematically illustrates a terminal apparatus owned by a user (employee), and corresponds to the client terminal 103 in the work-from-home environment 13. The image forming apparatus 112 schematically illustrates an image forming apparatus owned by the user, and corresponds to the image forming apparatus 113 in the work-from-home environment 13.

The following is descriptions on the assumption that a remote desktop is used as a technique for performing the processing of controlling the remote terminal 101 from the outside of the remote environment 11, for convenience of description. Specifically, in the second use form, the remote terminal 101 is controlled via the client terminal 102 by the remote desktop technique, thereby transmitting an instruction (e.g., a print job) for printing to the image forming apparatus 112 via the CPS 109 from the remote terminal 101. However, the technique applied in this use form is not limited to the remote desktop technique, and any technique can be used, as long as the terminal apparatus included in the environment to which access from an external apparatus is limited can be controlled from the outside of the environment.

The image forming apparatus 111 corresponds to an example of a "second image forming apparatus", and the remote terminal 101 corresponds to an example of a "second terminal apparatus". A network (e.g., in-house network) to which the image forming apparatus 111 and the remote terminal 101 are connected corresponds to an example of a "first network". The client terminals 102 and 103 each correspond to an example of a "first terminal apparatus". The image forming apparatuses 112 and 113 each correspond to an example of a "first image forming apparatus" that is different from the second image forming apparatus and is configured to receive a print job from the first terminal apparatus. A network (e.g., home network) to which each of the client terminals 102 and 113 is connected corresponds to an example of a "second network".

Figure 2:
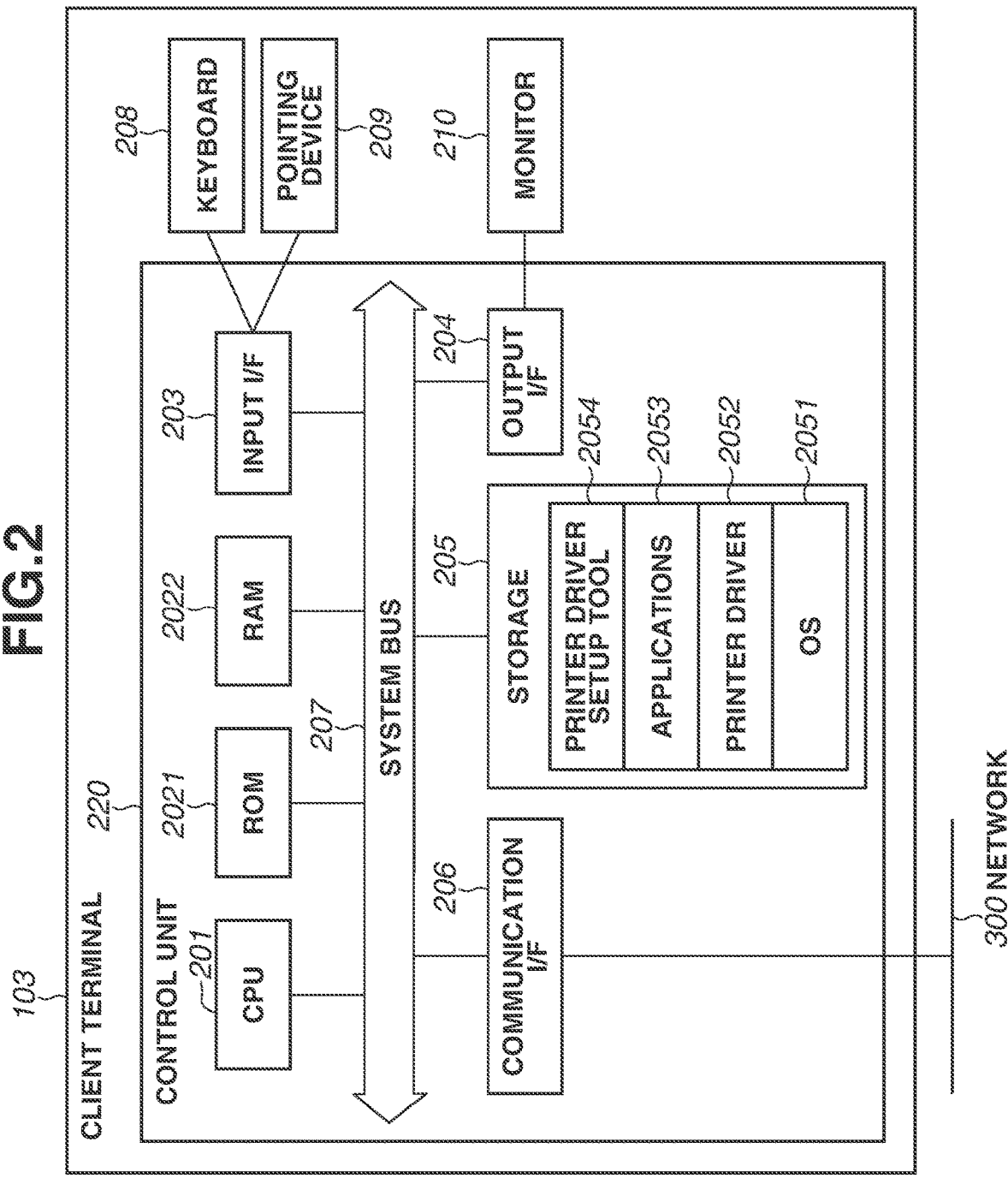
FIG. 2 is a block diagram illustrating a hardware configuration example of a client terminal according to one embodiment.

A hardware configuration example of the client terminal 103 illustrated in FIG. 1 will be described with reference to FIG. 2. The client terminal 102 corresponds to the client terminal 103 in the work-from-home environment 13. A hardware configuration similar to that illustrated in FIG. 2 can be applied to the client terminal 102, and thus the detailed description thereof will be omitted.

The client terminal 103 includes a control unit 220, input devices, including a keyboard 208 and a pointing device 209, and an output device such as a monitor 210. The control unit 220 includes a central processing unit (CPU) 201, a read-only memory (ROM) 2021, a random access memory (RAM) 2022, and a storage 205. The control unit 220 also includes an input interface (I/F) 203, an output I/F 204, and a communication I/F 206.

The CPU 201 is a central processing unit that controls various operations of the client terminal 103. For example, the CPU 201 directly or indirectly controls other devices connected through various buses (e.g., a system bus 207) or various devices, thereby running programs for carrying out various functions (e.g., functions according to the present example embodiment). The ROM 2021 stores programs (e.g., a basic input/output system (BIOS)) to be used for the CPU 201 to control operations of the client terminal 103. The RAM 2022 is a main storage memory of the CPU 201, and is used as a work area or a temporary storage area for loading various programs. The storage 205 stores various types of data. In a specific example, the storage 205 stores an operating system (OS) 2051 as basic software, programs for various applications 2053, and a printer driver 2052. The storage 205 may also store a printer driver setup tool 2054. The printer driver setup tool 2054 schematically illustrates a program for constructing the work-from-home environment, and is used to install the above-described driver for business use. The storage 205 can be, for example, a nonvolatile memory as typified by a hard disk drive (HDD) or a solid-state drive (SSD).

The input I/F 203 is a connection interface for connecting input devices such as the keyboard 208 and the pointing device 209. With an input device connected to the input I/F 203, the input device is connected to various devices, such as the CPU 201, through various buses (e.g., the system bus 207). The output I/F 204 is a connection interface for connecting the output device such as the monitor 210. With an output device connected to the output I/F 204, the output device is connected to various devices, such as the CPU 201, through various buses (e.g., the system bus 207). The communication I/F 206 is an interface that is connected to a predetermined network 300 (e.g., a LAN or the Internet) and is used to communicate with an external apparatus via the network 300.

The above-described configuration is a mere example, and the hardware configuration of the client terminal 103 is not limited to the example. In a specific example, some components (e.g., at least the keyboard 208, the pointing device 209, or the monitor 210) among a series of components of the client terminal 103 described above may be externally attached to the client terminal 103.

Figure 3:
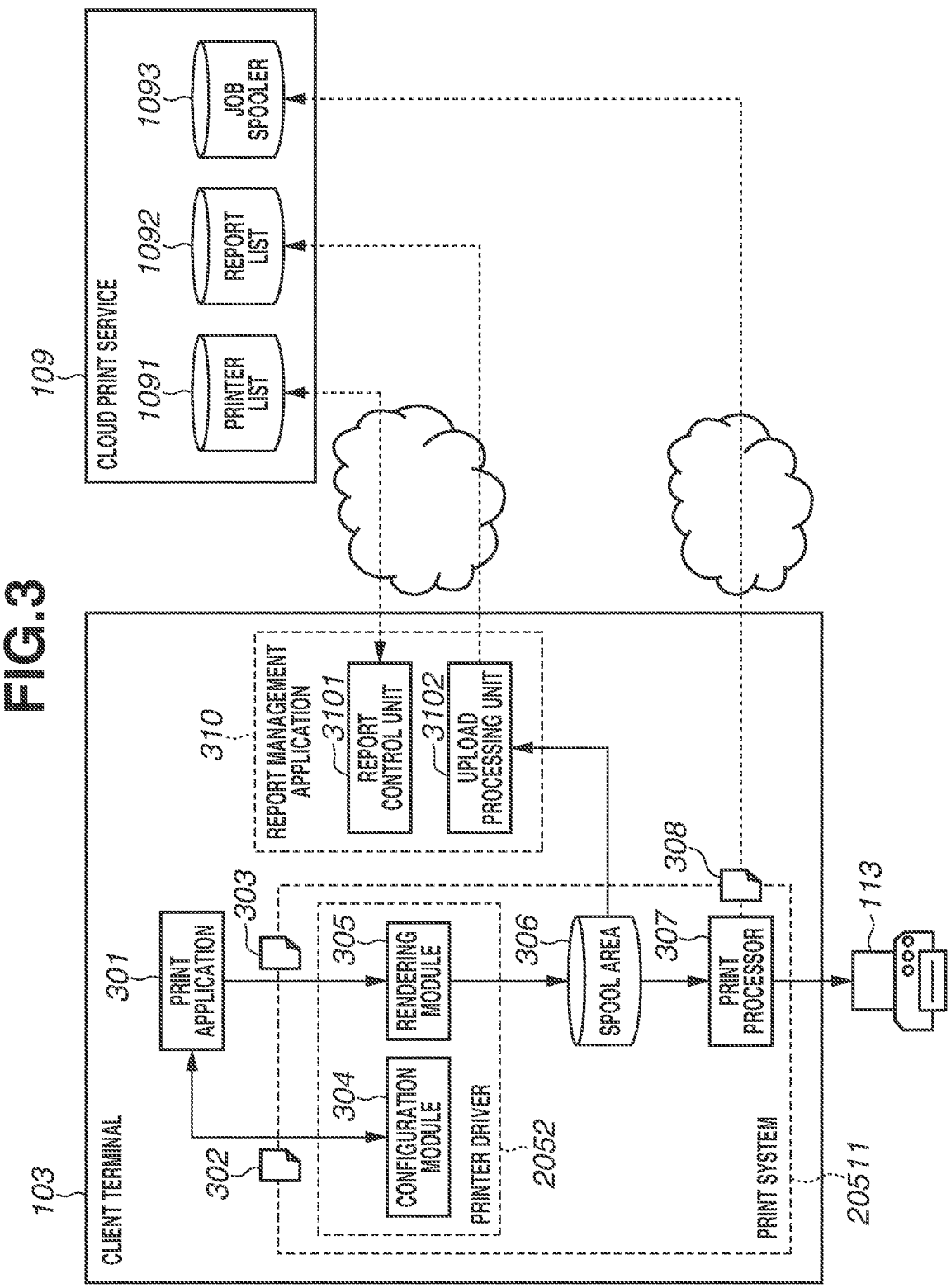
FIG. 3 is a block diagram illustrating a functional configuration example of the image processing system according to one embodiment.

A functional configuration illustrated in FIG. 3 and processing illustrated in FIGS. 4, 5, 7, 11, and 12 can be implemented by the CPU 201 loading programs stored in the ROM 2021 or the storage 205 into the RAM 2022 and running the programs.

A functional configuration example of the image processing system according to the present example embodiment will be described with reference to FIG. 3, especially, by focusing on the functional configurations of the client terminal 103 and the CPS 109 when the image processing system is used in the first use form.

The functions of the client terminal 103 according to the present example embodiment are carried out by operating a print application 301, a print system 20511, and a report management application 310 in cooperation. The print application 301 and the print system 20511 operate on, for example, the OS 2051.

The print application 301 schematically illustrates an application for transmitting an instruction for printing to the print system 20511. For example, the print application 301 can correspond to an application including a print function, in particular, among typical applications such as a document editing application, a spread sheet application, and an image editing application.

The print system 20511 can be provided by, for example, the OS 2051. The print system 20511 schematically illustrates a series of pieces of software for performing various processing for printing. The print system 20511 includes the printer driver 2052, a print processor 307, and a spool area 306. The printer driver 2052 performs various processing for printing using, for example, a graphics device interface (GDI). The printer driver 2052 includes a configuration module 304 and a rendering module 305.

The configuration module 304 provides functions for editing various types of setting information (hereinafter also referred to as "print setting information 302") for printing. The print setting information 302 can include auxiliary information for forming a print job 308 during printing, such as a double-sided printing setting, a color print setting, and a sheet size setting. The print setting information 302 may also include information that has no direct relation with processing for printing, such as information about the user that receives a printing instruction, or information about the time when processing for printing is performed. The print setting information 302 may be provided to other applications, such as the print application 301, from the print system 20511.

The rendering module 305 receives print data 303 to be printed from the print application 301, and converts the print data 303 into data in a format that is interpretable by the image forming apparatus 113 that performs processing for printing. Examples of the format include a page description language (PDL). The format is not limited to the PDL and any other formats can be applied, as long as the format is interpretable by the image forming apparatus 113 that performs processing for printing. The print job 308 schematically illustrates a job used to instruct a desired image forming apparatus to perform processing for printing. For example, the print job 308 is formed based on the print data 303 in the converted format.

In converting the print data 303, the rendering module 305 may reflect the print setting information 302 edited by the configuration module 304 in the print job 308. For example, if a setting for printing with a plurality of pages allocated to one sheet is made, which is called layout printing, the rendering module 305 may perform processing for reducing the size of the print data 303 depending on the number of pages to be allocated. In a more specific example, if two pages are allocated to one sheet, the rendering module 305 may place data corresponding to two pages on one sheet by reducing the size of the print data 303 to an image with a size of about ½ of the original size.

In response to the completion of the conversion of the print data 303, the rendering module 305 transmits the print job 308 based on the converted print data 303 to the spool area 306. Thus, the print job 308 is held in the spool area 306.

If the print system 20511 determines that the image forming apparatus 113 can process the subsequent data, the print system 20511 transmits the print job 308 held in the spool area 306 to the print processor 307.

Upon receiving the print job 308, the print processor 307 switches the processing for printing depending on the use form when the use form of the client terminal 103 corresponds to the first use form or the second use form described above.

In a specific example, with the first use form as the use form of the client terminal 103, the print processor 307 transmits the received print job 308 to the image forming apparatus 113. In this case, the print processor 307 instructs the report management application 310 described below to transmit information (hereinafter also referred to as a "print report") for management of the use state of the image forming apparatus 113 to the CPS 109.

In another example, with the second use form, the print processor 307 transmits the print job 308 to the CPS 109. In this case, the print job 308 transmitted to the CPS 109 is held in a job spooler 1093 of the CPS 109. The job spooler 1093 is a storage area used for the CPS 109 to store print jobs.

The report management application 310 provides a function for generating and managing a print report, and a function for transmitting (uploading) the print report to the CPS 109. The report management application 310 corresponds to an example of a function included in the above-descried driver for business use. The report management application 310 includes a report control unit 3101 and an upload processing unit 3102.

The report control unit 3101 performs various types of processing for generating and updating the print report. The report control unit 3101 may perform the processing for generating and updating the print report for each image forming apparatus that performs processing for printing. In this case, the report control unit 3101 may perform the processing for generating and updating the print report for each image forming apparatus of which, for example, the use state is managed by the CPS 109 (e.g., from which the number of prints is counted). For example, a printer list 1091 schematically illustrates information about a series of image forming apparatuses each of which the use state is managed by the CPS 109. In other words, the report control unit 3101 can recognize each image forming apparatus of which the use state is managed by the CPS 109 with reference to the printer list 1091.

The upload processing unit 3102 transmits the print report generated or updated by the report control unit 3101 to the CPS 109. The CPS 109 holds the print report transmitted from the upload processing unit 3102, by storing the print data into a predetermined storage area. A report list 1092 schematically illustrates a series of pieces of print report data held and stored in the predetermined storage area by the CPS 109.

The above-described configuration is a mere example, and the functional configuration of the image processing system according to the present example embodiment is not limited to the example illustrated in FIG. 3, as long as the functions provided by the above-described components are implementable. For example, at least some among a series of components of the client terminal 103 described above may be implemented by a plurality of apparatuses operating in cooperation. In a specific example, some (e.g., the print application 301) among a series of components of the client terminal 103 may be provided in another apparatus different from the client terminal 103. In another example, the processing load of performing processing by at least some among a series of components of the client terminal 103 may be divided among a plurality of apparatuses.

Figure 4:
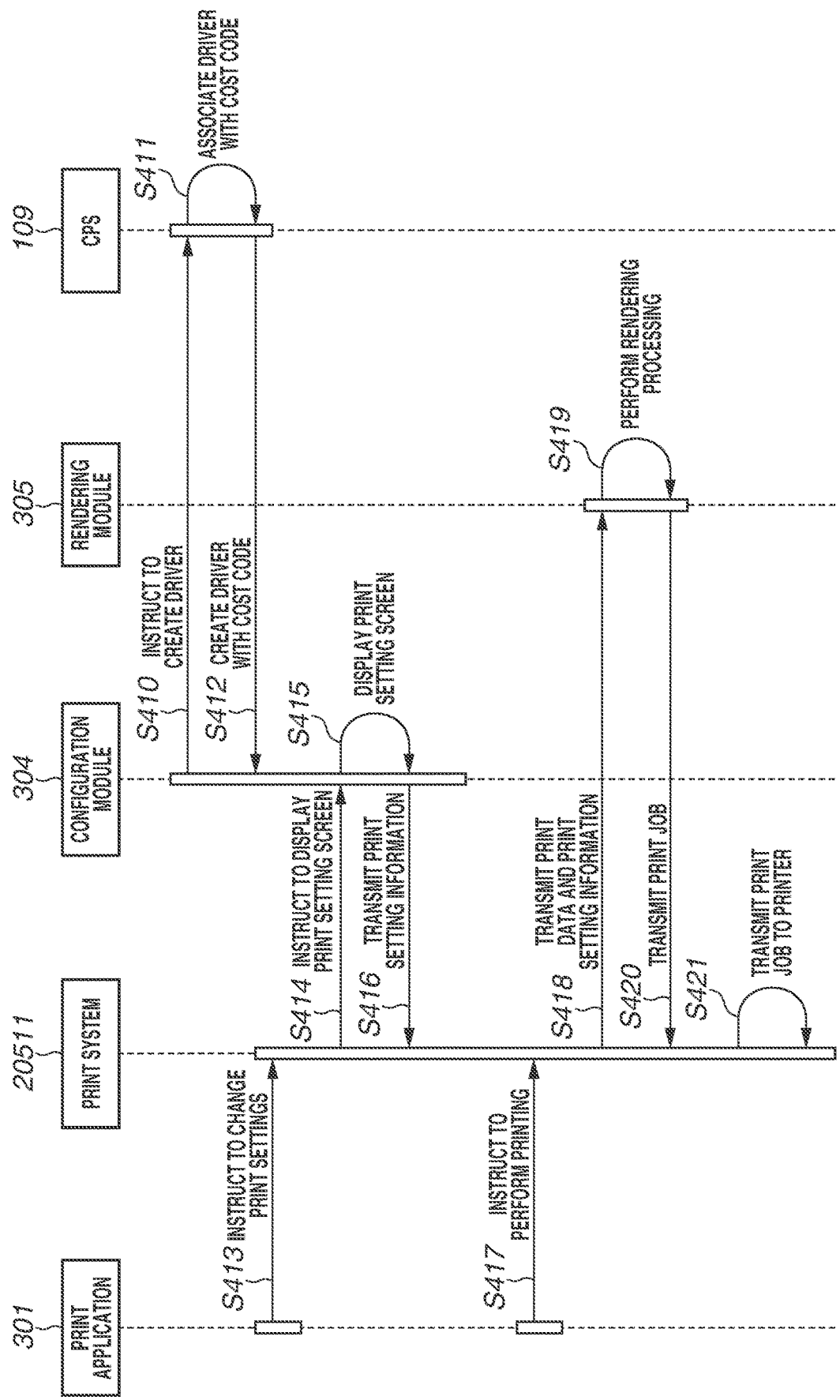
FIG. 4 is a sequence diagram illustrating a print processing sequence according to one embodiment.

A processing example of the image processing system according to the present example embodiment will be described. An example of a print processing sequence will now be described with reference to FIG. 4. FIG. 4 is a sequence diagram illustrating an example of a print processing sequence in the case of using the driver for business use including a function for charging the company with the cost of printing on an image forming apparatus owned by an individual for business use.

In step S410, the configuration module 304 instructs the CPS 109 to create a driver (driver for business use) for the target image forming apparatus (e.g., the image forming apparatus 113).

In step S411, the CPS 109 creates the driver in response to the instruction from the configuration module 304 in step S410, and associates a cost code with the driver. The cost code is identification information used to classify and manage the cost of printing for business use using the target image forming apparatus. For example, the CPS 109 may associate the cost code preliminarily assigned to the target user (user that owns the terminal apparatus in which the driver for business use is installed) with the created driver.

In step S412, the CPS 109 reflects the creation result (e.g., setting of the cost code) of the driver with the cost code created in step S411 in the configuration module 304. That allows setting information about printing using the created driver to be updated through the configuration module 304.

The processing of steps S410 to S412 may be omitted if the driver with the cost code is already reflected in the configuration module 304.

In step S413, the print application 301 instructs the print system 20511 to change print setting information. In a specific example, the print application 301 may instruct the print system 20511 to change the print setting information based on a designation by the user via a print setting screen provided by the print application 301. The print setting screen provided by the print application 301 is displayed according to a user interface (UI) provided by the print application 301. In a specific example, the above-described print setting screen may be displayed by selecting a print menu from a file pull-down menu presented on the UI of the print application 301.

In step S414, the print system 20511 instructs the target printer driver 2052 to display the print setting screen provided by the printer driver 2052 in response to the instruction from the print application 301 in step S413.

In step S415, the configuration module 304 of the printer driver 2052 performs processing for displaying the print setting screen provided by the printer driver 2052. The print setting screen corresponds to a screen for receiving, from the user, the designation of setting information about printing controllable by the printer driver 2052. Examples of the setting information about printing include a double-sided printing setting and a color print setting.

In step S416, in response to receiving an instruction to update the print setting information from the user via the print setting screen displayed in step S415, the configuration module 304 updates the print setting information 302 based on the instruction. Then, the configuration module 304 transmits the updated print setting information 302 to the print system 20511. Thus, the setting information about printing to be performed by the print system 20511 is updated.

When updating of the setting information about printing is completed, in step S417, the print application 301 receives an instruction to perform printing from the user and instructs the print system 20511 to perform printing.

In step S418, the print system 20511 instructs the printer driver 2052 to perform printing in response to the instruction from the print application 301 in step S417.

In step S419, the rendering module 305 of the printer driver 2052 converts the print data 303 to be printed into data in a format interpretable by the image forming apparatus in response to the instruction from the print system 20511 in step S418. The conversion processing to be performed on the print data 303 is also referred to as rendering processing. The rendering module 305 creates the print job 308 including the print data 303 on which the conversion processing has been performed.

In step S420, the rendering module 305 transmits the print job 308 created in step S419 to the print system 20511.

In step S421, the print system 20511 transmits the print job 308 received from the rendering module 305 of the printer driver 2052 in step S420 to the image forming apparatus (e.g., the image forming apparatus 113) that performs processing for printing.

Figure 5:
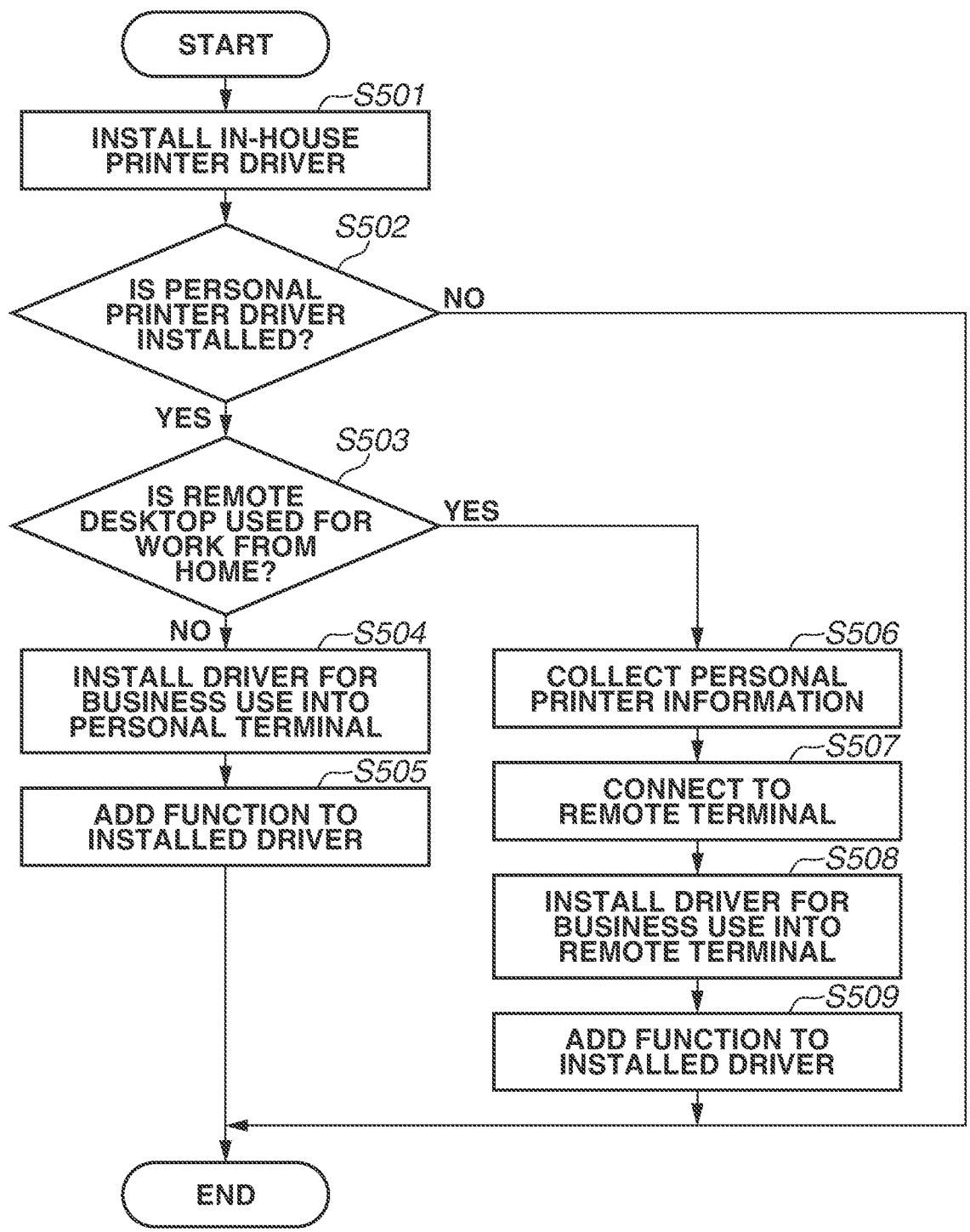
FIG. 5 is a flowchart illustrating an example of processing performed by an installer according to one embodiment.

Next, an example of processing for creating the driver for business use so that the image forming apparatus owned by the user as an employee of the predetermined company is used for business use will be described with reference to FIG. 5. FIG. 5 is a flowchart illustrating a processing example in which the installer for constructing the work-from-home environment generates the driver for business use depending on whether the use form of the terminal apparatus subject to construction of the work-from-home environment corresponds to the first use form or the second use form described above. The installer or application for constructing the work-from-home environment is hereinafter also referred to as the "installer", for convenience of description. That is, the term "installer" used in the following description refers to the installer or application for constructing the work-from-home environment, unless otherwise noted. The installer is implemented such that, for example, the CPU 201 of the terminal apparatus (e.g., the terminal apparatus owned by the user) subject to construction of the work-from-home environment runs the program (e.g., the printer driver setup tool 2054) for constructing the work-from-home environment.

In step S501, the installer installs a driver for an image forming apparatus (hereinafter also referred to as an "in-house printer") under control of the predetermined company (e.g., the company to which the user belongs) on the target terminal apparatus (terminal apparatus owned by the user).

The processing of step S501 may be omitted, if the target in-house printer is not present, or if the target driver for the in-house printer is already installed.

In step S502, the installer determines whether a driver for an image forming apparatus owned by the user (hereinafter also referred to as a "personal printer") is installed on the target terminal apparatus. The personal printer can correspond to another printer different from the above-described in-house printer. An example of a method of determining whether the driver for the personal printer is installed on the target terminal apparatus will be described below with reference to FIGS. 7 to 10.

If the installer determines that the driver for the personal printer is installed on the target terminal apparatus in step S502 (YES in step S502), the processing proceeds to step S503.

On the other hand, if the installer determines that the driver for the personal printer is not installed on the target terminal apparatus in step S502 (NO in step S502), a series of processing illustrated in FIG. 5 is terminated.

In step S503, the installer determines whether a work-from-home form (in other words, a use form in which the terminal apparatus owned by the user is used during work from home) corresponds to the form in which the remote desktop technique is used (i.e., the second use form).

In step S503, if the installer determines that the work-from-home form does not correspond to the form (second use form) in which the remote desktop technique is used (NO in step S503), the processing proceeds to step S504.

On the other hand, if the installer determines that the work-from-home form corresponds to the form (second use form) in which the remote desktop technique is used in step S503 (YES in step S503), the processing proceeds to step S506.

Figure 6:
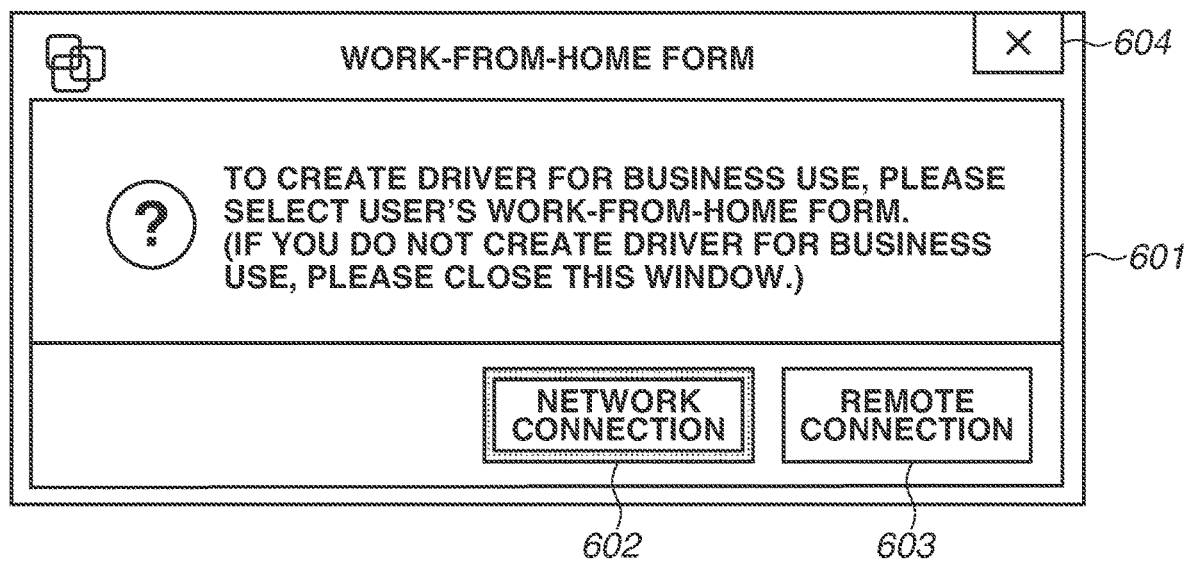
FIG. 6 illustrates an example of a user interface (UI) for receiving a designation of a work-from-home form according to one embodiment.

An example of a method of determining the work-from-home form will now be described. As the method of determining the work-from-home form, there is, for example, a determination method based on a designation by the user. For example, a dialog box 601 illustrated in FIG. 6 is an example of a UI for receiving the designation of the work-from-home form from the user. The dialog box 601 includes buttons 602 and 603 for designating the work-from-home form. The button 602 is a button for receiving the designation of the first use form as the work-from-home form from the user. The button 603 is a button for receiving the designation of the second use form as the work-from-home form from the user. The dialog box 601 may include a button 604 for closing the dialog box 601. If the button 604 is pressed, for example, the processing of installing the driver for business use may be terminated.

The above-described method is a mere example and any other methods may be used, as long as it can be determined that the work-from-home form corresponds to the first use form or the second use form. In a specific example, it may be automatically determined whether the work-from-home form corresponds to the first use form or the second use form depending on the method of connecting the terminal apparatus owned by the user to the in-house network from the outside of the in-house network.

Referring again to FIG. 5, the processing of steps S504 and S505 will now be described. The processing of steps S504 and S505 is performed when the work-from-home form corresponds to the first use form.

In step S504, the installer installs the driver for business use that can be used for the target terminal apparatus to transmit a print job to the personal printer.

In step S505, the installer adds a function for using the personal printer for business use to the driver for business use installed on the terminal apparatus in step S504. In a specific example, the installer may add a function, such as a function for setting a cost code used to manage the cost of using the personal printer for business use, or a function for transmitting a print report to the CPS 109, to the above-described driver for business use. After completion of the processing of step S505, a series of processing illustrated in FIG. 5 is terminated.

Next, the processing of steps S506 to S509 will be described. The processing of steps S506 to S509 is performed when the work-from-home form corresponds to the second use form.

In step S506, the installer acquires information about the personal printer. In a specific example, the installer may extract information about the personal printer from the driver for the personal printer installed on the terminal apparatus subject to construction of the work-from-home environment. Examples of the information about the personal printer can include identification information (e.g., a serial number) based on which the personal printer can be individually identified.

In step S507, the installer is connected to the remote terminal 101 to be controlled by the remote desktop technique.

In step S508, the installer installs the driver for business use that can be used to transmit a print job to the personal printer on the remote terminal using information (e.g., the above-described identification information) about the personal printer acquired in step S506.

In step S509, the installer adds a function for using the personal printer for business use to the driver for business use installed on the remote apparatus in step S508. The processing of step S509 is substantially similar to the processing of step S505, except for the driver for business use to which the function is added. After completion of the processing of step S509, a series of processing illustrated in FIG. 5 is terminated.

Next, an example of a method of determining whether the driver for the personal printer is installed on the target terminal apparatus will be described with reference to FIGS. 7 to 10. Specifically, if the driver-for-business creation processing is performed on all the drivers installed on the target terminal apparatus, the driver for business use can be created for drivers other than the driver for the personal printer in some cases. Under such circumstances, drivers for business use that are not actually used by the user can be created, which may make it difficult for the user to easily select the driver for business use to be used for printing. This may lead to a decrease in user-friendliness. Now, an example of a method of determining whether the driver for the personal printer is installed on the target terminal apparatus will be described, especially, by focusing on a method of limiting the number of drivers for the personal printer to be generated in a more preferable mode.

In the examples described below with reference to FIGS. 7 to 10, the installer monitors a series of drivers installed on the target terminal apparatus, and determines whether the driver for the personal printer is installed based on the monitoring result. In this method, the installer identifies the driver corresponding to the driver for business use to be created from among a series of drivers installed on the target terminal apparatus. Then, the installer determines whether the driver for the personal printer is installed depending on whether the driver corresponding to the driver for business use to be created is identified.

Figure 7:
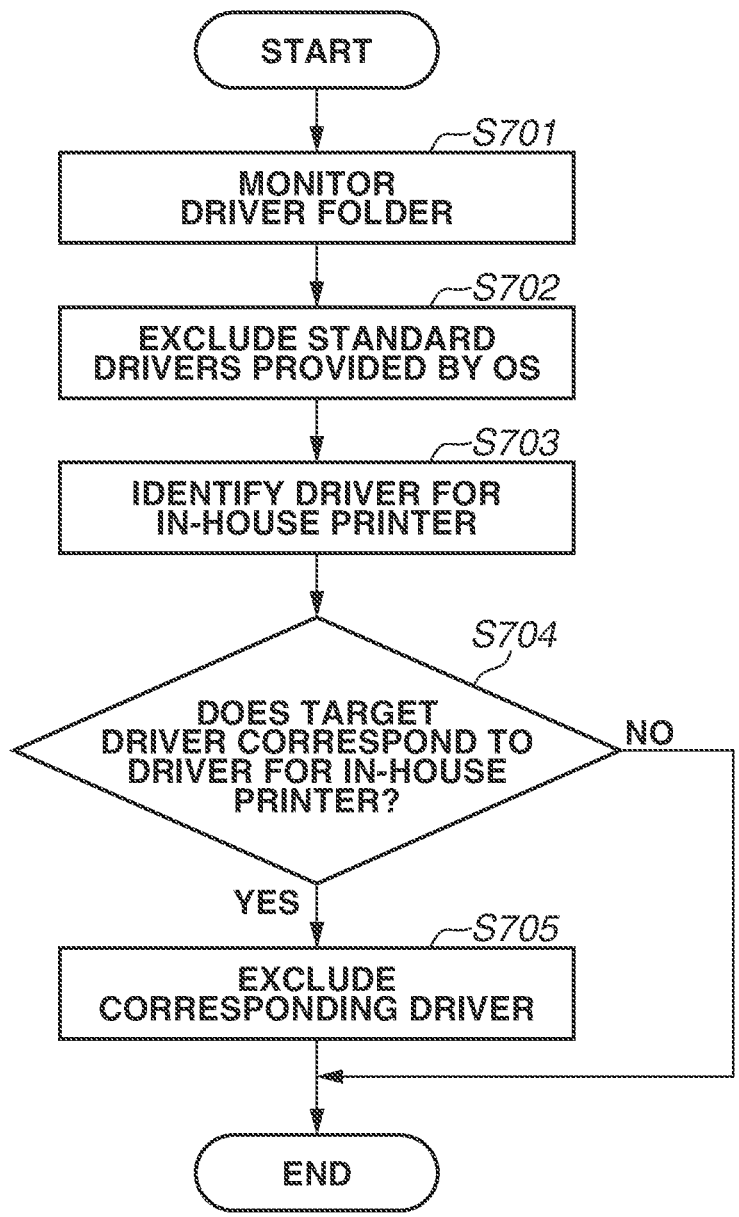
FIG. 7 is a flowchart illustrating an example of another processing performed by the installer according to one embodiment.
Figure 8:
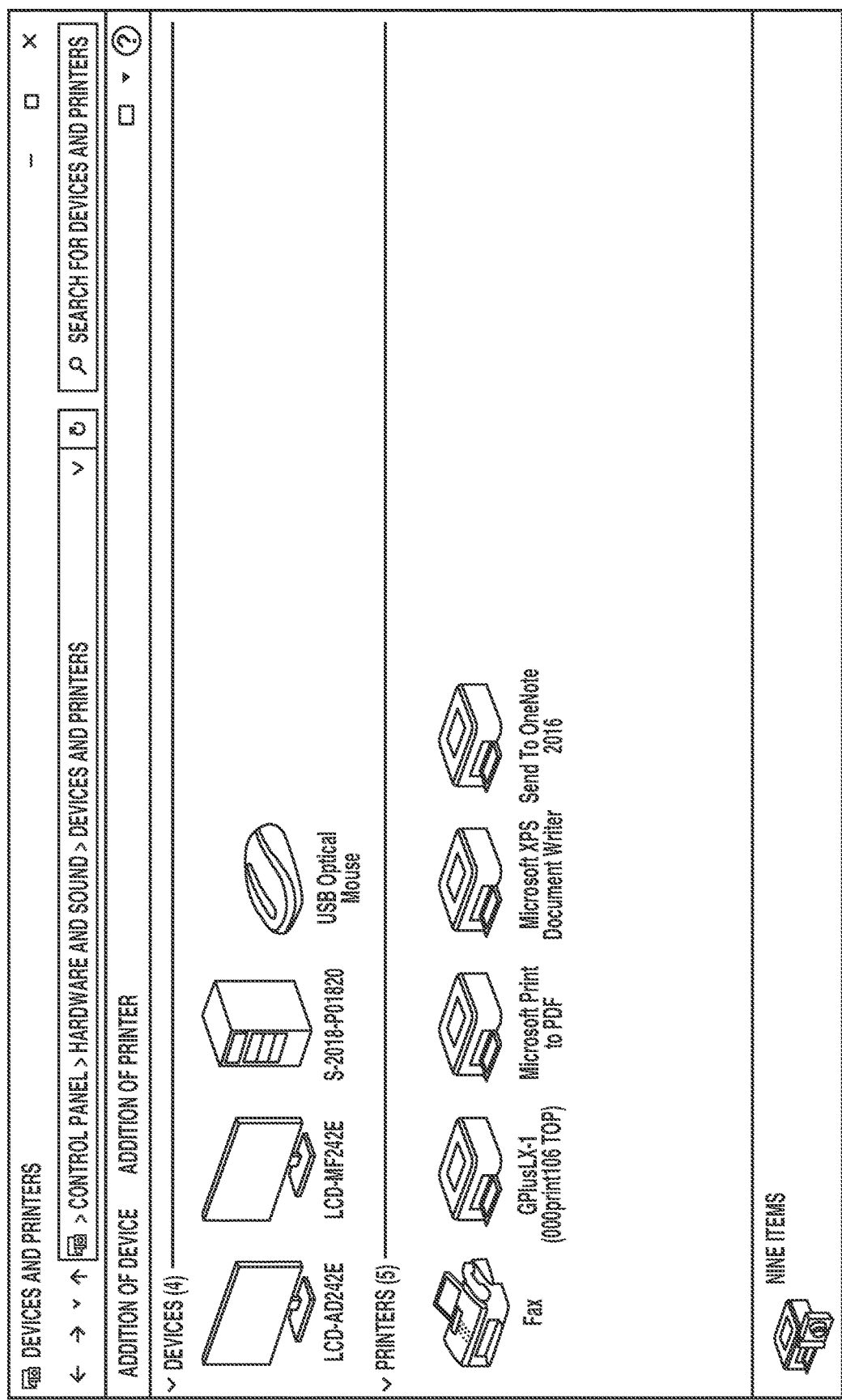
FIG. 8 illustrates an example of a mode for presenting a list of printer drivers according to one embodiment.

Processing illustrated in FIG. 7 will now be described. In step S701, the installer monitors a series of drivers installed on the terminal apparatus subject to construction of the work-from-home environment. In a specific example, the installer may recognize a series of drivers installed on the target terminal apparatus with reference to a folder storing various drivers. For example, FIG. 8 illustrates an example of a display mode of a list of printer drivers installed on the terminal apparatus. FIG. 8 illustrates an example of a screen on which a list of available printers (in other words, a list of printer drivers) is presented when Microsoft Windows® is used as an OS.

In step S702, the installer excludes standard drivers provided by the OS from candidates to be recognized as the driver for business use to be created among a series of drivers monitored in step S701. In a specific example, the installer may determine whether a series of drivers monitored each is one of the standard drivers provided by the OS, and may determine whether to exclude each driver from candidates to be recognized as the driver for business use to be created.

In step S703, the installer identifies the driver for the in-house printer from a series of drivers that are not excluded in the processing of step S702, thereby determining whether each driver corresponds to the driver for the in-house printer or the driver for the personal printer. Examples of a method of identifying whether the target driver corresponds to the in-house printer include a method using information, such as a so-called internet protocol (IP) address, to identify each image forming apparatus on a network, and a method using positional information about each image forming apparatus.

A method of determining whether the driver for the image forming apparatus corresponds to the driver for the in-house printer using information, such as an IP address, to identify the image forming apparatus on a network will now be described. In the following description, it is assumed that an IP address is used as information for identifying each image forming apparatus on a network.

Figure 9:
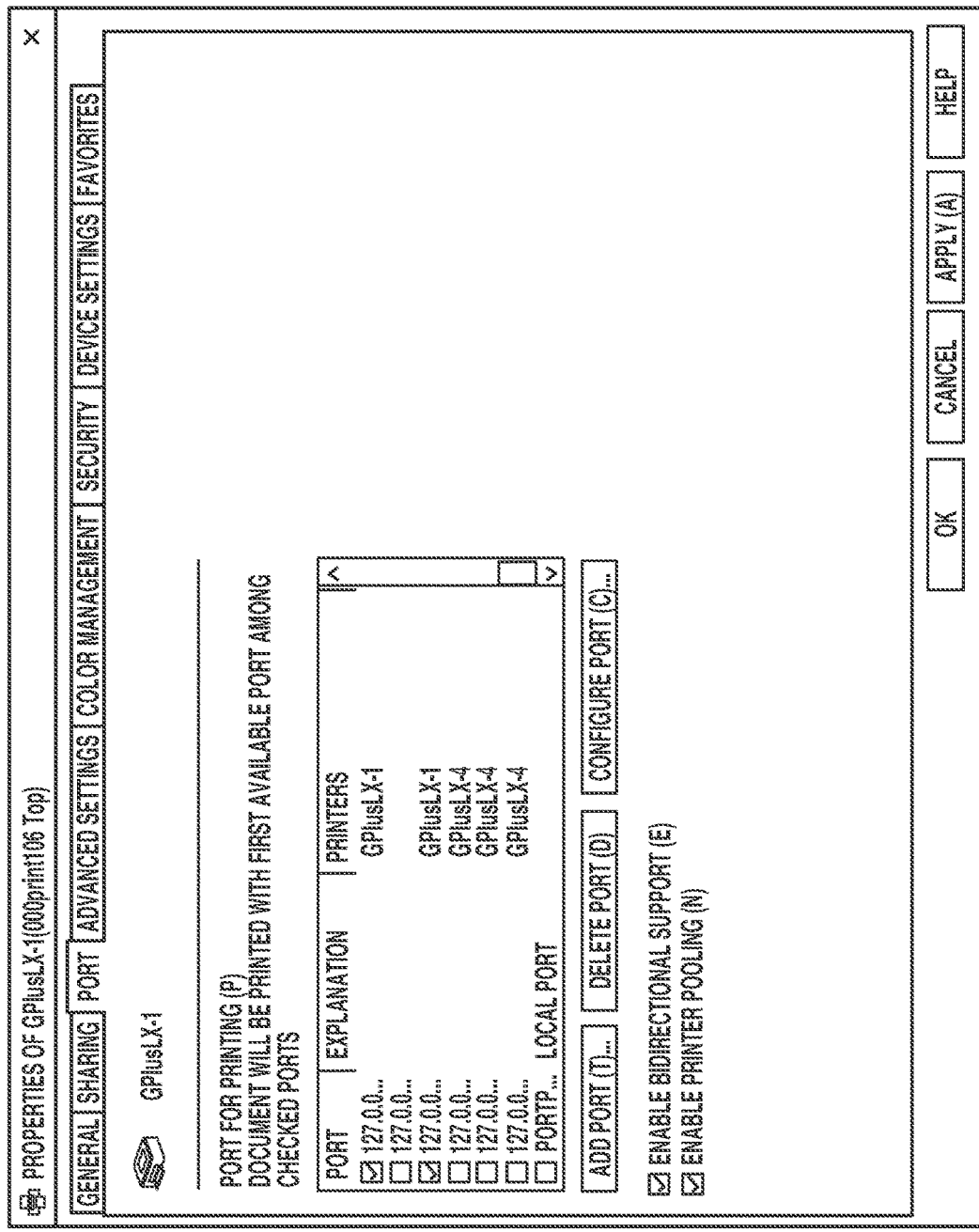
FIG. 9 illustrates a screen example of a port list presented thereon according to one embodiment.

For example, FIG. 9 illustrates an example of a property window 901 on which a list of ports to be used for each driver is presented. As illustrated in FIG. 9, an IP address assigned to the corresponding one of the image forming apparatuses corresponding to each driver can be identified with reference to information about the port used by the corresponding image forming apparatus.

The CPS 109 holds information about a location where each image forming apparatus registered in the CPS 109 is installed, and attribute information such as an IP address assigned to the image forming apparatus.

Based on the premises described above, for example, the installer identifies the IP address assigned to the image forming apparatus corresponding to the driver based on port information set to the driver. Then, the installer compares the IP address identified based on the information set to the driver with the IP address assigned to the image forming apparatus registered in the CPS 109, thereby determining whether the driver corresponds to the driver for the in-house printer.

Figure 10:
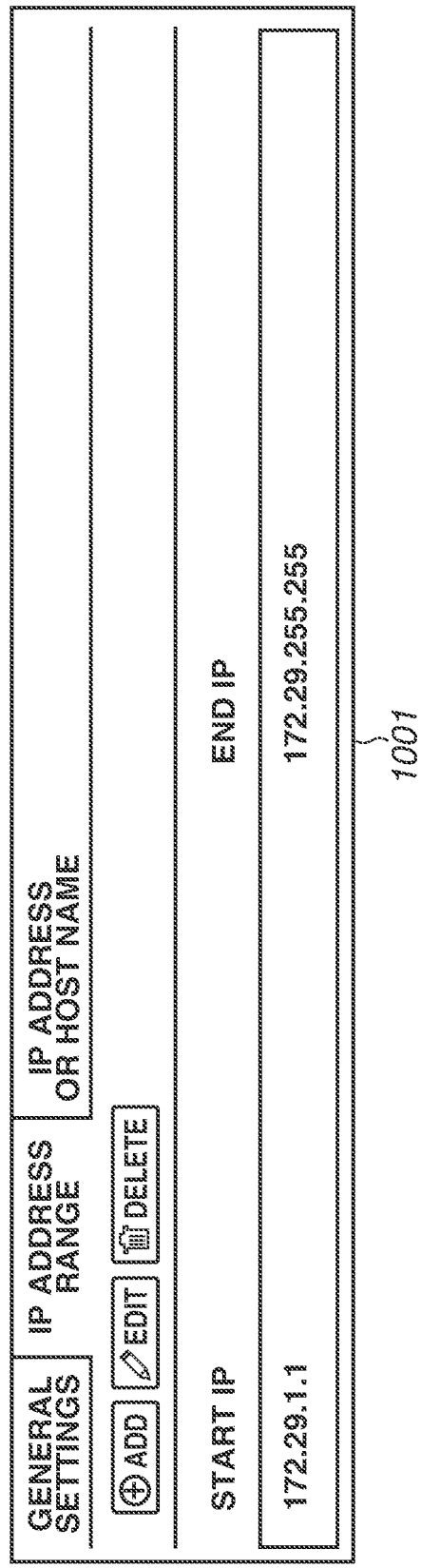
FIG. 10 illustrates an example of setting information about internet protocol (IP) addresses according to one embodiment.

In a specific example, FIG. 10 illustrates an example of setting information about the range of IP addresses assigned to in-house printers by the CPS 109 on the in-house network. In the example illustrated in FIG. 10, IP addresses in the range from "172.29.1.1" to "172.29.255.255" are assigned to the in-house printers, respectively. In other words, if the IP address set to the target driver is included in the above-described range, the driver can be recognized as the driver for the image forming apparatus (corresponding to the in-house printer) connected to the in-house network. On the other hand, if the IP address set to the target driver is outside of the above-described range, the driver can be recognized as the driver for the image forming apparatus connected to an external network different from the in-house network.

Next, a method of determining whether the driver corresponds to the driver for the in-house printer based on positional information about the image forming apparatus corresponding to the target driver and a method of acquiring the positional information will be described. For example, the OS may provide a function for identifying a location where an apparatus, such as an image forming apparatus, is installed. In a specific example, application programming interfaces (APIs) provided by Microsoft Windows® include an API used to provide a developer with positional information about the image forming apparatus. A cloud service, such as a CPS, may hold positional information about an apparatus such as a registered image forming apparatus. The positional information about the image forming apparatus corresponding to the target driver is acquired using OS or cloud service functions, and the positional information is compared with the positional information about the company, thereby making it possible to determine whether the driver corresponds to the driver for the in-house printer.

Specifically, if the positional information about the image forming apparatus corresponding to the target driver is included in an area where the company to which the user (employee) belongs is located, it can be determined that the driver corresponds to the driver for the in-house printer. More specifically, if the image forming apparatus corresponding to the target driver is located within an area where a building or tenant of a predetermined company is located, it is highly likely that the driver corresponds to the driver for the image forming apparatus under control of the company. In view of this situation, if the positional information about the image forming apparatus corresponding to the target driver is included in the area where the building or tenant of the predetermined company is located, it may be determined that the driver corresponds to the driver for the in-house printer (image forming apparatus under control of the company).

It is also possible to determine whether the driver corresponds to the driver for the personal printer (in order words, the driver corresponds to the driver for the in-house printer) depending on the connection form between the image forming apparatus corresponding to the target driver and the terminal apparatus owned by the user. Specifically, in the work-from-home environment, the connection form is generally used in which the personal printer is connected to the terminal apparatus via a port compatible with the predetermined standard, such as a USB. On the other hand, the connection form in which the personal printer is connected to the terminal apparatus via a port compatible with the predetermined standard, such as a USB, is not generally used for the in-house printer. In view of the tendencies described above, for example, if the port set to the target driver is a port compatible with the predetermined standard, such as a USB, the installer may determine that the driver corresponds to the driver for the personal printer.

Referring again to FIG. 7, the installer determines whether a series of drivers that are not excluded in the processing of step S702 each correspond to the driver for the in-house printer or the driver for the personal printer by the above-described method.

In step S704, the installer determines whether the target driver corresponds to the driver for the in-house printer, and changes the subsequent processing depending on the determination result.

If the installer determines that the target driver corresponds to the driver for the in-house printer in step S704 (YES in step S704), the processing proceeds to step S705. In this case, in step S705, the installer excludes the target driver from the candidates to be recognized as the driver for business use to be created (in order words, the driver for the personal printer).

On the other hand, if the installer determines that the target driver does not correspond to the driver for the in-house printer (NO in step S704), the processing of step S705 on the target driver is skipped. In other words, in this case, the installer recognizes the target driver as a candidate for the driver for business use to be created.

According to the example embodiment described above, a system is introduced for using an image forming apparatus in different ways depending on the use form of the image forming apparatus in a more preferable mode.

Modified Example 1

An image processing system according to Modified Example 1 of the above-described example embodiment will be described. The example embodiment described above illustrates a method of determining whether each driver corresponds to the driver for the in-house printer using the IP address set to the driver, or positional information about the image forming apparatus corresponding to the driver. Modified Example 1 illustrates an example of a method of determining whether to create the driver for business use in when it is difficult to check the ID address or the positional information corresponding to the driver.

Specifically, for example, a driver for an image forming apparatus not present or not in use created as the driver for business use is not actually used. If the number of drivers for business use that are not actually used increases, the number of candidates increases when the user selects the driver for business use to be used for printing. This may make it difficult for the user to easily select the driver for business use, leading to a decrease in user-friendliness. Thus, Modified Example 1 illustrates an example of a method of limiting the number of drivers for business use to be created in a more preferable mode.

Figure 11:
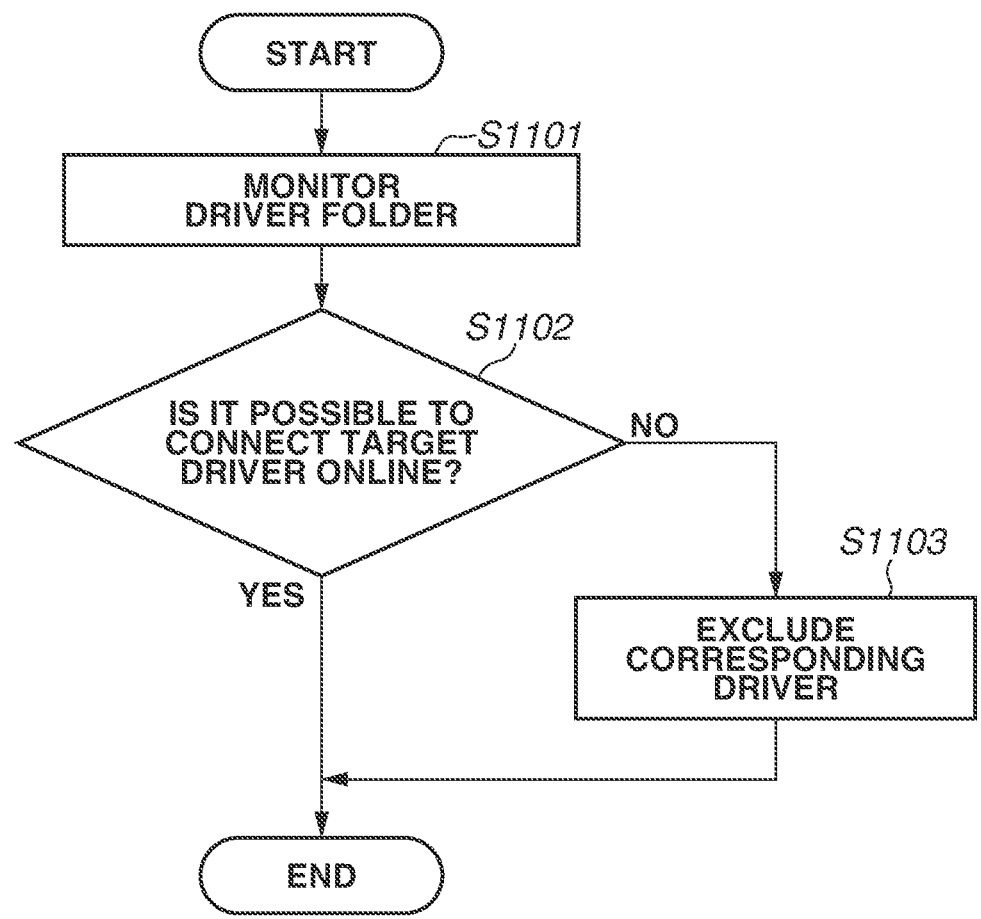
FIG. 11 is a flowchart illustrating an example of still another processing performed by the installer according to one embodiment.

An example of processing performed by the image processing system according to Modified Example 1 will be described with reference to FIG. 11, especially, by focusing on processing performed by the installer to identify the driver for the image forming apparatus that has not been used before the construction of the work-from-home environment.

In step S1101, the installer monitors a series of drivers installed on the terminal apparatus subject to construction of the work-from-home environment, and checks whether each driver is connectable online (in other words, whether the corresponding image forming apparatus is connectable to a network).

For example, the installer may check whether the target driver is connectable online depending on whether the connection to the network is established by each of a Transmission Control Protocol/Internet Protocol (TCP/IP) connection, a connection via a LAN cable, and a wireless connection based on a predetermined standard such as Wi-Fi®.

In step S1102, the installer changes the subsequent processing depending on whether the image forming apparatus corresponding to the target driver is connectable online. In a specific example, the installer may determine whether to exclude the driver from driver candidates recognized as the driver for business use to be created depending on whether the image forming apparatus corresponding to the target driver is connectable online.

If the installer determines that the online connection of the image forming apparatus corresponding to the target driver is limited in step S1102 (NO in step S1102), the processing proceeds to step S1103. In this case, in step S1103, the installer excludes the target driver from the driver candidates recognized as the driver for business use to be created (in other words, the driver for the personal printer).

On the other hand, if the installer determines that the image forming apparatus corresponding to the target driver is connectable online in step S1102 (YES in step S1102), the processing of step S1103 on the target driver is skipped. In other words, the installer recognizes the target driver as a candidate for the driver for business use to be created.

The application of the above-described control processing makes it possible to exclude the driver for which, for example, the positional information about the selected image forming apparatus is difficult to acquire, from the candidates for the driver for business use to be created. That prevents the occurrence of a situation where the number of candidates for the driver for business use to be used for printing is excessively increased, and thus prevents the complication of the operation of selecting the driver for business use to be used for printing. Furthermore, it can be expected that the user-friendliness for the operation can be improved.

Modified Example 2

Next, an image processing system according to Modified Example 2 will be described. Modified Example 2 illustrates an example of processing performed when the driver for the personal printer has not been installed on the target terminal apparatus before construction of the work-from-home environment. Specifically, in Modified Example 2, if the driver for the personal printer is installed on the target terminal apparatus, the installer for constructing the work-from-home environment detects the installation of the driver and creates the driver for business use corresponding to the driver. On the other hand, if the driver for the personal printer is not installed on the target terminal apparatus, even when the installer is started by running the program for constructing the work-from-home environment, the processing is terminated without the processing of creating the driver for business use. Under such circumstances, a specific example of processing performed by the image processing system according to Modified Example 2 will be described. The processing to be described below is performed when, for example, the driver for business use is created again in a situation where the processing of creating the driver for business use is not performed in response to a press of the button 604 on the dialog box 601 illustrated in FIG. 6.

Figure 12:
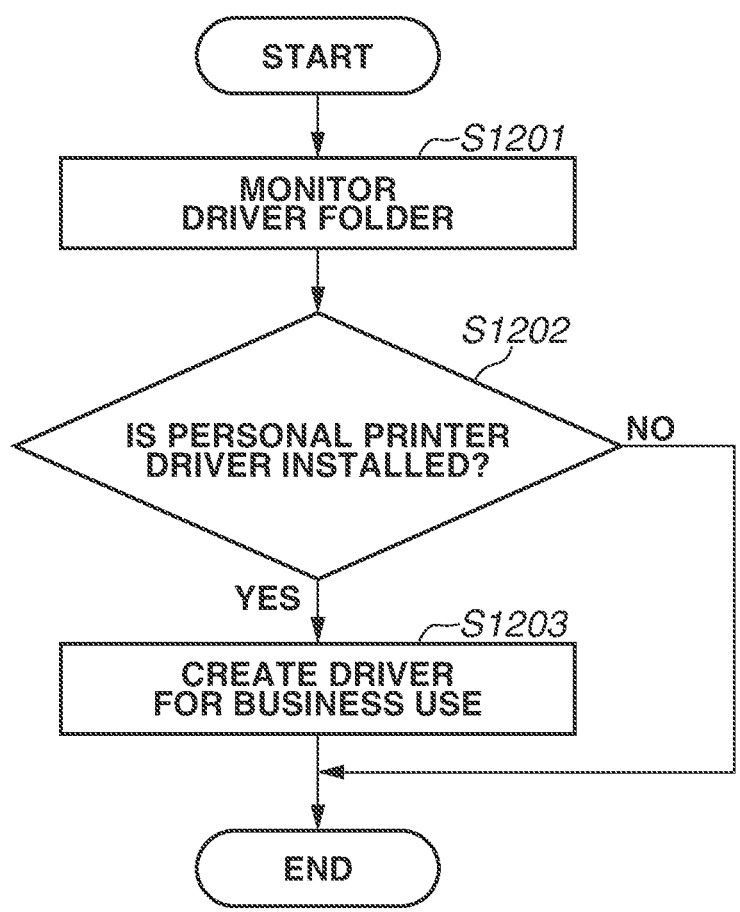
FIG. 12 is a flowchart illustrating an example of still one more processing performed by the installer according to one embodiment.

An example of processing performed by an image processing system according to the present modified example will now be described with reference to FIG. 12.

In step S1201, the installer monitors a series of drivers installed on the terminal apparatus subject to construction of the work-from-home environment, and checks whether a driver for the personal printer is installed. As a method of identifying the driver for the personal printer, a method similar to that described in the example embodiment and other modified examples described above can be applied, and thus the detailed description will be omitted. In step S1202, the installer changes the subsequent processing depending on whether the driver for the personal printer is installed on the target terminal apparatus.

If the installer determines that the driver for the personal printer is installed on the target terminal apparatus in step S1202 (YES in step S1202), the processing proceeds to step S1203. In step S1203, the installer performs processing for creating the driver for business use corresponding to the installed driver for the personal printer.

On the other hand, if the installer determines that the driver for the personal printer is not installed on the target terminal apparatus in step S1202 (NO in step S1202), the processing of step S1203 is skipped. In other words, the processing for creating the driver for business use will not be performed.

Figure 13:
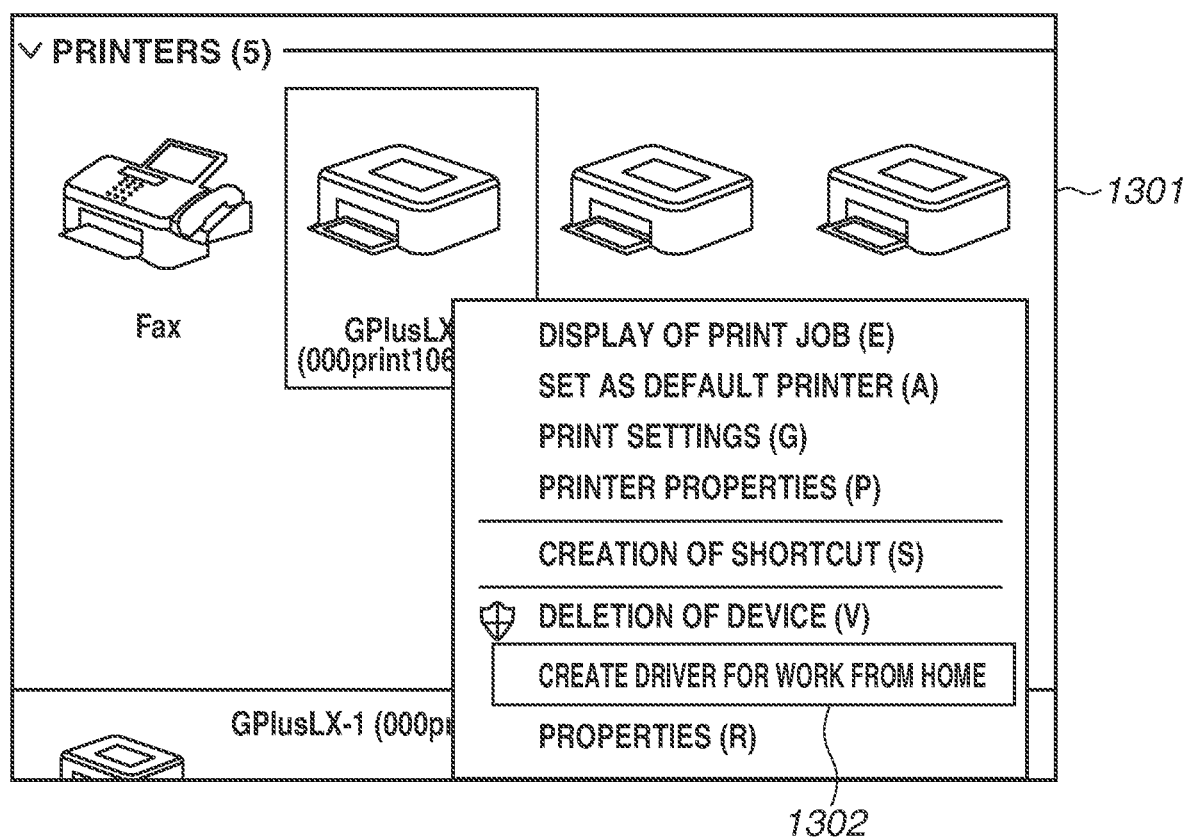
FIG. 13 illustrates an example of a method of creating a driver for business use according to one embodiment.

An example of a method of creating the driver for business use will now be described. For example, FIG. 13 illustrates an example of the method of creating the driver for business use, and also illustrates an example of a UI for designating a driver for the creation of the driver for business use corresponding to the target driver in response to the designation of the target driver from the user. In the example illustrated in FIG. 13, a list of drivers installed on the target terminal apparatus is presented on the screen. When a predetermined operation (e.g., right click) is performed on one of the drivers in the driver list presented on the screen, a menu screen 1301 for receiving the designation of processing on the driver from the user is displayed. When a menu 1302 for creating the driver for business use is designated among the menus presented on the menu screen 1301, the installer may be started to create the driver for business use corresponding to the driver designated by the installer.

Figure 14:
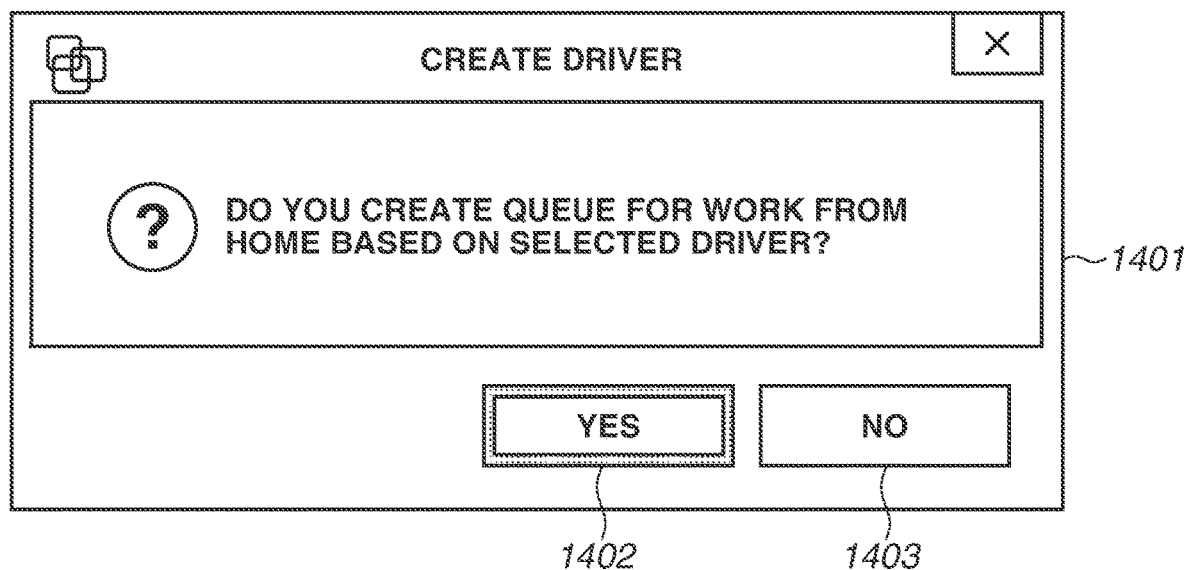
FIG. 14 illustrates a user interface (UI) example of creating the driver for business use according to one embodiment.

If the menu 1302 is designated on the menu screen 1301, the user may check whether the designated driver for business use is to be created. For example, a dialog box 1401 illustrated in FIG. 14 is an example of a UI used for the user to check whether to create the driver for business use corresponding to the designated driver for business use. The dialog box 1401 includes buttons 1402 and 1403 for receiving an instruction to create the driver for business use from the user. In response to a press of the button 1402, the installer performs processing for creating the driver for business use corresponding to the target driver. On the other hand, in response to a press of the button 1403, the processing for creating the driver for business use corresponding to the target driver is interrupted.

Figure 15:
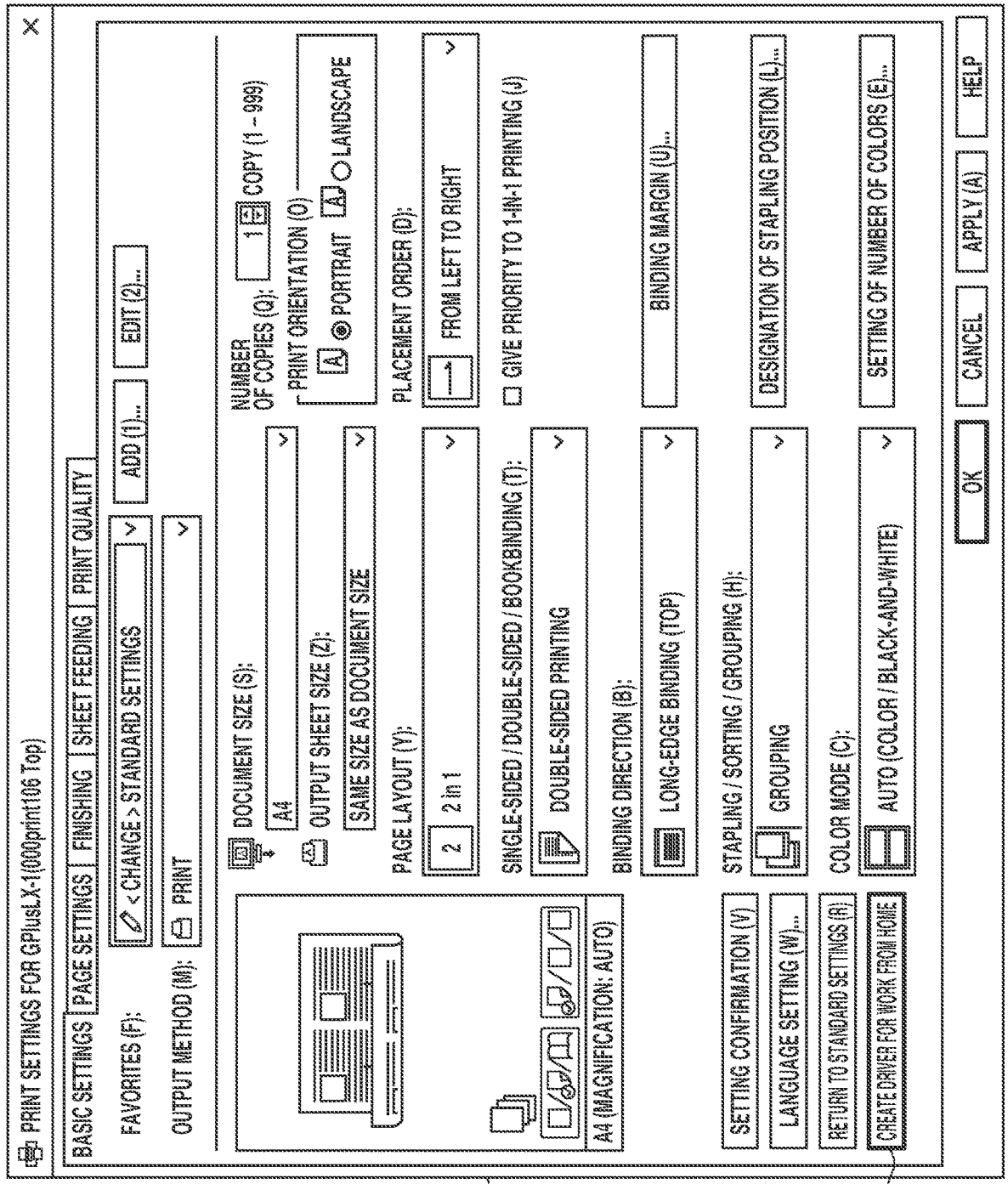
FIG. 15 illustrates a UI example of print settings according to one embodiment.

The instruction to create the driver for business use may be received via a screen for receiving the designation of print settings for the target driver from the user. For example, a setting screen 1501 illustrated in FIG. 15 is an example of a screen for receiving the designation of print settings for the target driver from the user. The setting screen 1501 illustrated in FIG. 15 includes a button 1502 for receiving an instruction to create the driver for business use from the user. Specifically, the installer performs the processing for creating the driver for business use corresponding to the target driver in response to a press of the button 1502. In response to a press of the button 1502, the dialog box 1401 for causing the user to check whether the designated driver for business use is to be created may be displayed.

In printing performed by pull printing using the driver for the personal printer, the installer may perform the processing for creating the driver for business use in the processing for printing. For example, in pull printing using the driver for the personal printer, the dialog box 1401 for causing the user to check whether the driver for business use is to be created may be displayed. In this case, in response to a press of the button 1402, the installer performs the processing for creating the driver for business use.

As described above, the image processing system according to Modified Example 2 allows the driver for business use corresponding to the driver for the personal printer to be created at a desired timing, that is, in the construction of the work-from-home environment, and after the construction of the work-from-home environment. Consequently, even if a new driver for the personal printer is installed on the target terminal apparatus after the construction of the work-from-home environment, the image processing system allows the driver for business use corresponding to the new driver for the personal printer to be created at a desired timing after the new driver is installed.

OTHER EXAMPLE EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the example embodiments have been described above by focusing on a case where an image forming apparatus owned by an individual is used in work from home, the example embodiments do not limit the application of the technique according to the present disclosure. In a specific example, the apparatus used in different ways depending on the use form is not limited to the above-described image forming apparatus, as long as the apparatus is used in different use forms. For example, the techniques according to various embodiments of the present disclosure can be applied to any apparatus used in different ways for private purpose and for business purpose. Other examples of the apparatus can include a facsimile and a scanner.

While example embodiments have been described in the present disclosure, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-086062, filed May 21, 2021, which is hereby incorporated by reference herein in its entirety.

What is claimed is:

1. A non-transitory computer readable storage medium storing a program for causing a first terminal apparatus connected to a first network to perform a process for installing a printer driver, the process comprising:
determining whether the first terminal apparatus is being used in a remote form in which the first terminal apparatus is remotely controlling a second terminal apparatus connected to a second network,
wherein the first terminal apparatus performs control to, depending on whether it is determined that the first terminal apparatus is being used in the remote form, either (i) install a first driver at the first terminal apparatus or (ii) install a second driver at the second terminal apparatus,
wherein:
in a case where the first terminal apparatus is not being used in the remote form, control is performed so that the first driver is installed on the first terminal apparatus, the first driver being used by the first terminal apparatus to transmit a print job to a first image forming apparatus connected to the first network; and
in a case where the first terminal apparatus is being used in the remote form, control is performed so that the second driver is installed on the second terminal apparatus, the second driver being used by the second terminal apparatus to transmit the print job to the first image forming apparatus.

2. The non-transitory computer readable storage medium according to claim 1, wherein the first driver includes a function for transmitting the print job, and a program for carrying out a predetermined function.

3. The non-transitory computer readable storage medium according to claim 2, wherein the predetermined function includes at least one of a function for setting information about a print cost or a function for transmitting a print report.

4. The non-transitory computer readable storage medium according to claim 1, wherein the first image forming apparatus is an image forming apparatus owned by a user of the first terminal apparatus.

5. The non-transitory computer readable storage medium according to claim 1, wherein in a case where a driver for the first image forming apparatus is already installed on the first terminal apparatus, the determination is made whether the first terminal apparatus is used in the remote form in which the second terminal apparatus is remotely controlled.

6. The non-transitory computer readable storage medium according to claim 5, wherein the process further comprises determining whether or not a driver for the first image forming apparatus is already installed on the first terminal apparatus, and
wherein the determination whether the driver for the first image forming apparatus is already installed on the first terminal apparatus is made based on information about an address for identifying the first image forming apparatus.

7. The non-transitory computer readable storage medium according to claim 5, wherein the process further comprises determining whether or not a driver for the first image forming apparatus is already installed on the first terminal apparatus, and
wherein the determination whether the driver for the first image forming apparatus is already installed on the first terminal apparatus is made based on information about a port for the driver installed on the first terminal apparatus.

8. The non-transitory computer readable storage medium according to claim 1, wherein the determination whether the first terminal apparatus is used in the remote form in which the second terminal apparatus is remotely controlled is made based on an instruction from a user of the first terminal apparatus.

9. The non-transitory computer readable storage medium according to claim 1, wherein in a case where the first terminal apparatus is used in the remote form, the first terminal apparatus collects information about the first image forming apparatus from a driver installed on the first terminal apparatus, and controls, based on the collected information, the second driver to be used by the second terminal apparatus to transmit the print job to the first image forming apparatus, and the second driver to be installed on the second terminal apparatus.

10. The non-transitory computer readable storage medium according to claim 1, wherein the second network is a network under control of a predetermined company, and a connection to the second network from an external apparatus is limited.

11. An information processing method executed by a first terminal apparatus connected to a first network, the information processing method comprising:
  determining whether the first terminal apparatus is being used in a remote form in which the first terminal apparatus is remotely controlling a second terminal apparatus connected to a second network,
  wherein the first terminal apparatus performs control to, depending on whether it is determined that the first terminal apparatus is being used in the remote form, either (i) install a first driver at the first terminal apparatus or (ii) install a second driver at the second terminal apparatus,
  wherein:
  in a case where the first terminal apparatus is not being used in the remote form, control is performed so that the first driver is installed on the first terminal apparatus, the first driver being used by the first terminal apparatus to transmit a print job to a first image forming apparatus connected to the first network; and
  in a case where the first terminal apparatus is being used in the remote form, control is performed so that the second driver is installed on the second terminal apparatus, the second driver being used by the second terminal apparatus to transmit the print job to the first image forming apparatus.

12. An information processing apparatus connected to a first network, the information processing apparatus comprising:
  at least one memory that stores a program; and
  at least one processor that executes the program to perform:
  determining whether the information processing apparatus is being used in a remote form in which the information processing apparatus is remotely controlling another terminal apparatus connected to a second network,
  wherein the information processing apparatus performs control to, depending on whether it is determined that the information processing apparatus is being used in the remote form, either (i) install a first driver at the information processing apparatus or (ii) install a second driver at the other terminal apparatus,
  wherein:
  in a case where the Information processing apparatus is not being used in the remote form, control is performed so that the first driver is installed on the Information processing apparatus, the first driver being used by the Information processing apparatus to transmit a print job to a first image forming apparatus connected to the first network; and
  in a case where the Information processing apparatus is being used in the remote form, control is performed so that the second driver is installed on the other terminal apparatus, the second driver being used by the other terminal apparatus to transmit the print job to the first image forming apparatus.

\* \* \* \* \*